Sept. 12, 1933.  G. RAUSCH  1,926,242
PRESSING AND CUTTING MECHANISM FOR AUTOMATIC
CUTTING, DIVIDING, AND KNEADING MACHINES
Filed Dec. 22, 1931
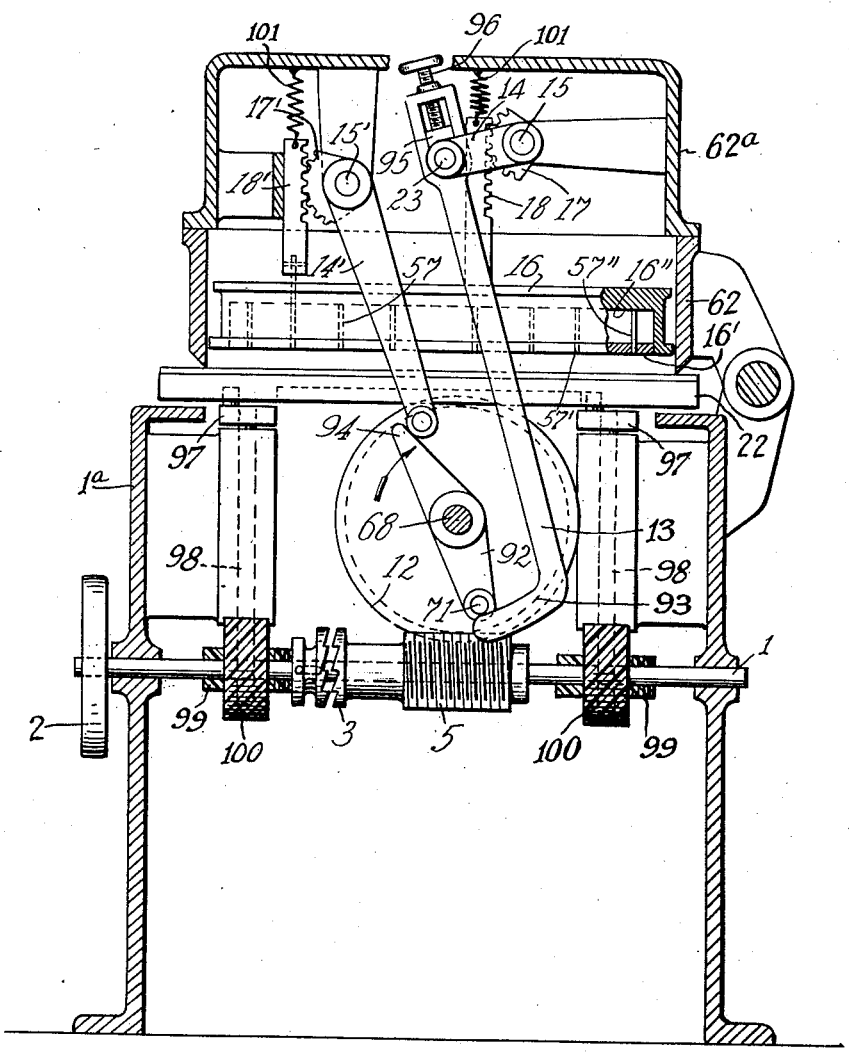
INVENTOR
Gottfried Rausch
BY
Sydney J. Prescott
ATTORNEY Patented Sept. 12, 1933

1,926,242

UNITED STATES PATENT OFFICE 1,926,242

PRESSING AND CUTTING MECHANISM FOR AUTOMATIC CUTTING, DIVIDING, AND KNEADING MACHINES

Gottfried Rausch, Ammendorf, near Halle-on-the-Saale, Germany

Application December 22, 1931, Serial No. 582,536, and in Germany December 22, 1930

2 Claims. (Cl. 107—20)

This invention relates to an improvement in the cutting and pressing mechanism of automatic cutting, dough dividing and kneading machines, particularly according to my prior Patents Nos. 1,851,328 and 1,876,022 granted March 29, 1932 and September 6, 1932, respectively, particularly as regards the adjustment and duration of the pressing, the action of the pressing pressure on the dough and the method of releasing the locking device between the pressing head and the dividing cutters.

The release of the locking mechanism by the use of locking surfaces sliding one upon the other has been found in the course of time not to be entirely satisfactory. The release was effected, whilst the surfaces were under a very considerable pressure. These surfaces may, therefore, be exposed to considerable wear which is deleterious in the course of time.

These disadvantages are eliminated in accordance with the present invention in that the pressing head and the cutters are each provided with a separate shaft for producing their operative movement, so that the pressing head and the cutters are moved independently of one another by the main drive of the machine. Both shafts are actuated preferably in the manner set out in my prior Patent No. 1,851,328, granted March 29, 1932 from a main crank shaft, but where however the cutter body is preferably not provided with the drive for the pressing head, but on the contrary this drive is directly connected to the cutter system and its pressing plate, whilst the cutter body bears against the pressing head in such a manner that during the pressing it bears closely against the pressing plate. As soon as the pressing has been completed there engage with the separate shaft appertaining to the cutters or with another part of the cutting mechanism, projections or cams which force the cutter out of the dividing head and through the dough. These cams or projections may be provided on the main crank shaft, on the pressing crank, on the pressing shaft or the like.

The necessity of adjusting the pressing pressure is due to the different constitution of the doughs. As the doughs, which must be treated in the machine without discrimination, fluctuate between a very solid and a very soft condition, each dough requires a different pressing pressure. It is only in this manner that the dough will be effectively treated and distributed uniformly over the entire pressing chamber (to which must be added, as hereinafter described in detail, that in the case of the treatment of solid doughs the dough must remain for a sufficient length of time under a constant pressing pressure).

Also the changing of a machine to a product of different weight requires a variation of the pressing mechanism.

According to the present invention the variation of the pressure or the adjustment of the machine to another weight is essentially effected in that any member of the pressing mechanism, for example the pressing crank, the connecting rod or the upper rocking member must be arranged to be adjustable in length or in its position relatively to the other members. In this manner adjustment or regulation of the pressing mechanism can be effected very conveniently and rapidly.

The correct pressing has hitherto caused considerable difficulties in all automatic dough dividing and kneading machines. The reason for this is that the pressing hitherto was of too short duration in a machine of this type. In order to obtain a uniform distribution of the dough in the pressing chamber the dough must remain for some time under an unchanged pressure in order to be able to flow, that is to say to completely fill the mould. In accordance with the invention the pressing is, therefore, effected in such a manner that the pressure remains the same for some time. This result is obtained in that a member of the pressing mechanism is so constructed that after reaching the pressing pressure the main drive, for example the driving crank, continues its operation, but the actual pressing mechanism remains at rest, whilst in the meantime exerting the necessary pressure on the dough.

One of the numerous possible forms of construction of the subject of the invention is illustrated diagrammatically in partial longitudinal section in the accompanying drawing.

The driving pulley 2 of the machine is coupled, by means of the preferably automatically operated clutch 3, during each operation with a worm 5 loosely mounted on the main shaft 1 which is journaled in the base 1a and with which engages a worm wheel 12. This wheel or its shaft 68 serves to produce the pressing and cutting operations.

For this purpose there is provided, in the example illustrated, on the shaft 68 a crank 92 having a pin 71 which engages with a pull rod 13 which through the medium of the rocking member 14 actuates the shaft 15 supported from the casing head 62a carried by the casing ring 62 hinged on the base 1a and located above the pressing device. The toothed segment 17, mounted on this shaft, presses the rack 18 of the pressing head 16 downwardly during the engagement of the pin 71 with the pull rod 13 so that its pressing plate 16' spreads the lump of dough on the kneading plate 22 outwardly against the casing ring 62 during the downward movement of the pressing head 16, the cutter device 57 bears with its upper edge 57' against the inside 16'' of the pressing head 16. The cutters are in this manner moved downwardly by the pressing head. The underside of the pressing plate 16' and the underside 57' of the cutting device 57 are thus in line with one another.

After completing the pressing a projection or cam 94, which in the example illustrated is mounted on the crank 92 and is adjustable relatively thereto, presses against a lever 14' which through the medium of the shaft 15' supported from the casing head, the toothed segment 17' and the rack 18', connected to the cutting mechanism, projects the cutters 57 from the pressing head until the lower edge thereof comes into contact with the kneading plate 22. In this manner the dough is divided.

After the divided dough is kneaded through the gyration of the kneading plate, effected through mechanism controlled by the clutch 3, as hereinafter described, the cutter 57 and pressing head 16 are returned to their raised position. The racks 18 and 18' which are yieldingly supported from the casing head 62a by tension springs 100' and 101, respectively, retract the pressing head and cutter to their raised position when the pull rod 13 and lever 14' are released by the crank 92 and cam 94.

The crank pin 71 and the cam 94 may also be provided directly on the worm wheel 12 or may be located at another suitable point of the driving mechanism.

For varying the pressing pressure a portion of the pressing mechanism, for example, the rod 13, is adjustable in length. The bearing 95 in this rod for the pivot 23 of the rocking member 14 can be moved in a slot 96 of the rod 13. A very slight adjustment of this bearing is sufficient to produce a considerable variation in the pressure.

In order that the pressure may be applied for some time without affecting the continued operation of the mechanism, and is particularly kept constant, the crank pin 71 during a portion of its rotation, which is preferably adjustable, engages with a cam shaped portion of the pressing mechanism. In the example illustrated the lower end of the rod 13 is hook shaped. With this hook shaped portion there engages the crank pin 71 and thus maintains the dough under a pressure which remains constant.

The kneading plate 22 is gyrated by the cranks 97 on crank shafts 98 which are journaled in the base 1a and driven by means of spiral gears 99, 100 from the drive shaft 1. After the dough has been divided and kneaded it may be removed when the clutch 3 is disengaged and the casing ring is swung back on its hinge, and then a fresh batch of dough may be placed on the kneading plate. Upon swinging the casing ring back on the kneading plate and engaging the clutch the same cycle of pressing, dividing, and kneading operations is repeated.

I claim:—

1. The combination with a dough pressing head, of a dough dividing cutter mounted in said head, and mechanism for independently operating said head and cutter to press and divide the dough, said mechanism including a continuously rotatable crank provided with a crank pin, a rack connected to said head, a gear segment meshing with said rack, a pull rod arranged to be engaged by said crank pin and connected to said gear segment and provided with a hook shaped end to cause said head to press the dough with a final constant pressure for a predetermined interval of time.

2. The combination with a dough pressing head of a dough dividing cutter mounted in said head, and mechanism for independently operating said head and cutter to press and divide the dough, said mechanism including a continuously rotatable crank having a projection therefrom, a rack connected to said cutter, a gear segment meshing with said rack, and a lever connected to said gear segment and arranged to be engaged by said projection to intermittently operate said cutter.

GOTTFRIED RAUSCH.